June 24, 1930.  W. H. BURTIS ET AL  1,765,566
GLARE SHIELD DEVICE FOR AUTOMOBILES
Filed March 26, 1928   2 Sheets-Sheet 1
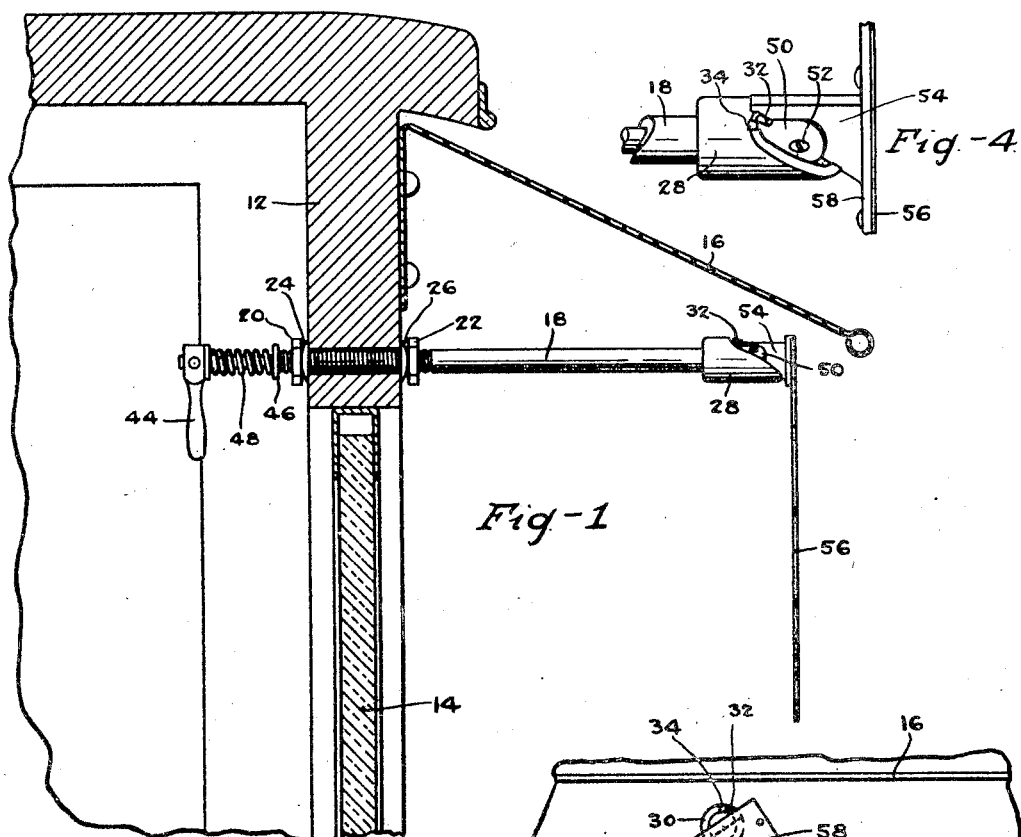
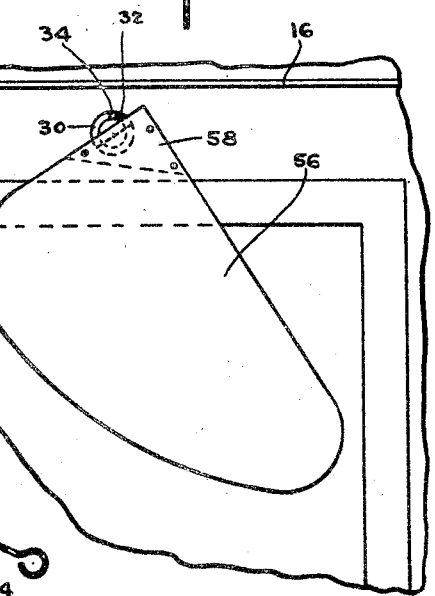
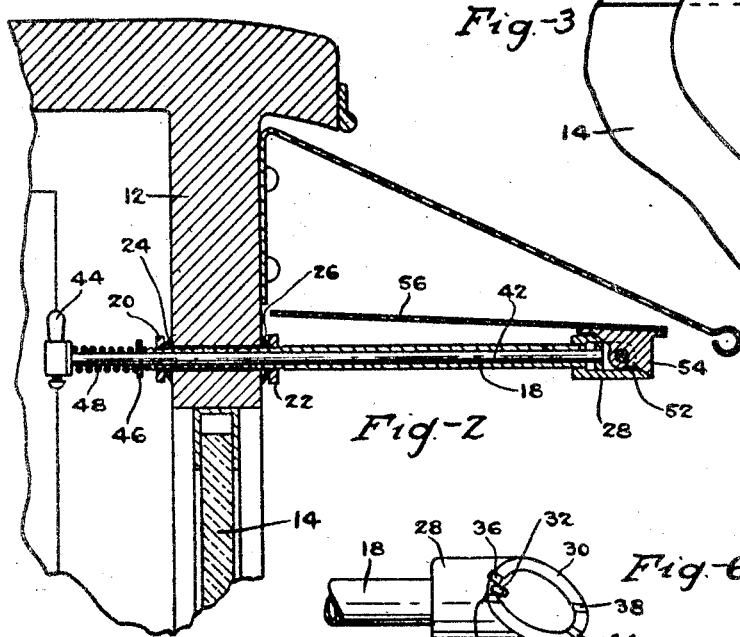
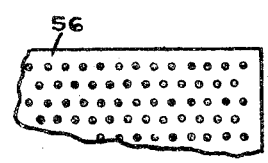
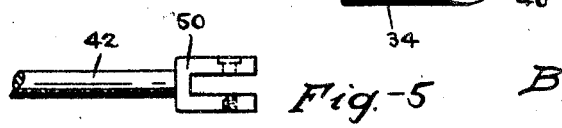
Inventors:
W. H. Burtis.
M. S. Howard.
By Whiteley and Ruckman
Attorneys.

June 24, 1930.  W. H. BURTIS ET AL  1,765,566
GLARE SHIELD DEVICE FOR AUTOMOBILES
Filed March 26, 1928    2 Sheets-Sheet 2
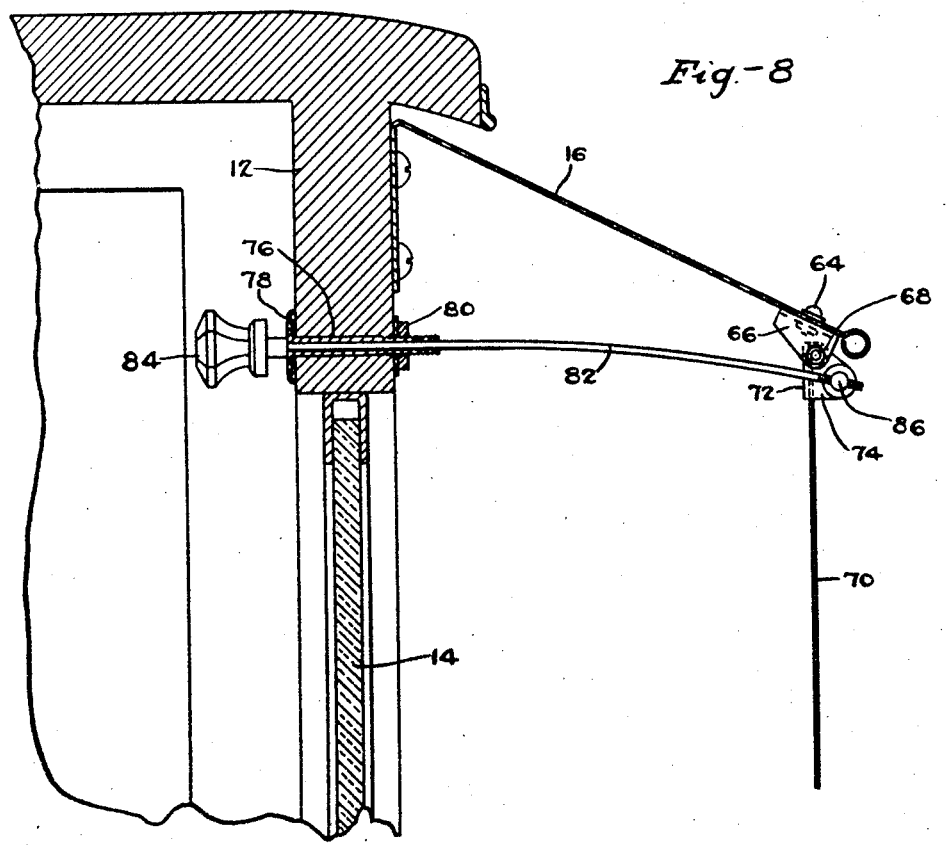
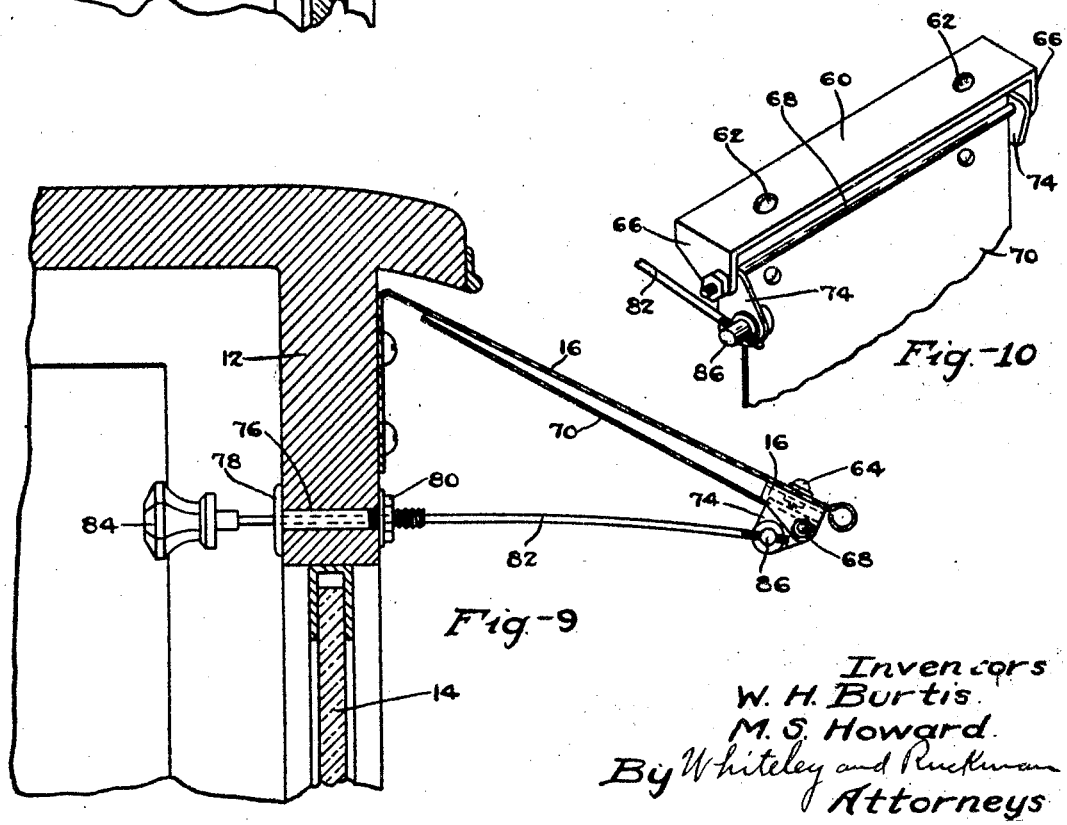
Inventors
W. H. Burtis
M. S. Howard
By Whiteley and Ruckman
Attorneys Patented June 24, 1930

1,765,566

UNITED STATES PATENT OFFICE

WILLIAM H. BURTIS, OF MINNEAPOLIS, AND MONROE S. HOWARD, OF HASTINGS, MINNESOTA

GLARE-SHIELD DEVICE FOR AUTOMOBILES

Application filed March 26, 1928. Serial No. 264,640.

Our invention relates to glare shield devices for automobiles. When glare shields are placed inside the automobile between the windshield and the driver and when they are attached directly to the windshield or supported so that they lie closely adjacent thereto, such glare shields are so near the driver's eyes that the shields are difficult to adjust for the purpose of dimming the light of the headlights of approaching automobiles without obstructing the view of the road ahead and furthermore, when the shields are not in use, they are unsightly and apt to be in the way. One of the objects of our invention, therefore, is to provide a glare shield which embodies a support positioned in advance of and above the windshield in combination with a screen swingingly mounted on said support and operating mechanism adapted to swing the screen down into operative position ahead of the windshield and to swing it up into folded position underneath the visor or forwardly projecting roof of the automobile. The blinding effect of the headlights of an approaching automobile is in part due to the reflection of the light from the dusty surface of the windshield which gives a highly illuminated surface between the driver and the road and beyond which surface it is difficult for the driver to see. Our glare shield has the further advantage that it intercepts the light from the headlights and casts a shadow on the portion of the windshield through which the driver looks. A further object is to provide a device of this character in which the screen member is firmly and automatically held in its operative or down position and in its folded or up position.

The full objects and advantages of our invention will appear in connection with the detailed description thereof and the novel features of our inventive idea will be particularly pointed out in the claims.

In the accompanying drawings which illustrate two of the forms in which our invention may be embodied,—

Fig. 1 is a sectional view of the windshield and frame and visor of an automobile showing the screen member of the glare shield lowered into position for use. Fig. 2 is a view similar to Fig. 1 except that the screen member is folded up underneath the visor. Fig. 3 is a front elevational view with the screen member lowered. Fig. 4 is a fragmentary view on an enlarged scale showing the support and operating mechanism for the screen member. Fig. 5 is a fragmentary view of an operating rod. Fig. 6 is a fragmentary view of a supporting member. Fig. 7 is a fragmentary plan view of one form of screen member which we may employ. Fig. 8 is a view drawn similarly to Fig. 1 and showing a modified form of construction. Fig. 9 is a view drawn similarly to Fig. 2 and showing the modified construction. Fig. 10 is a perspective view of the support for the screen member employed in this last form of the invention.

Referring to the drawings and first more particularly to the form shown in Figs. 1 to 7, the numeral 12 designates a frame member of the automobile beneath which is a windshield 14. As shown, a visor 16 is attached to the frame member 12 but it will be understood that the device is susceptible of use in connection with the form of automobile having a forwardly projecting roof in place of a separate visor. A tube 18 has a screwthreaded rear portion which extends through an opening in the frame 12 above the windshield, being secured in this opening by nuts 20 and 22 engaging with spring washers 24 and 26 placed at the rear and front of the opening respectively. The front end of the tube 18 carries an enlargement 28, the front end of which is beveled or inclined at an angle as best shown in Fig. 6. The rear or low portion of the beveled surface 30 is provided with a stop pin or projection 32 adjacent which are two notches 34 and 36, on opposite sides. Adjacent the high portion of the surface 30, there are two notches 38 and 40 cooperatively positioned to the notches 34 and 36 respectively. A rod 42 is rotatably and slidably mounted in the tube 18 and its rear end which projects beyond the tube 18 is provided with an operating handle 44. A washer 46 surrounds the rod 42 and lies against the rear end of the tube 18. A coiled spring 48 surrounds the rod 42 and is interposed between the handle 44 and the washer 46 so as to have a tendency to hold the rod in rearward position. The front end of the rod 42 is provided with a fork 50 adapted to move in the enlargement 28. The fork 50 is provided with a pivot pin 52 upon which a small flat plate 54 is pivoted. This plate is of such thickness that it is adapted to fit rather snugly into the notches 34 and 38 in one extreme position and into the notches 36 and 40 in another extreme position. The edge of the plate which is in engagement with the beveled surface 30 is beveled correspondingly thereto. A screen member 56 is secured by a corner piece 58 in right angled relation to what may be considered the outer end of the plate 54 when the device is in the position shown in Fig. 1. This screen member is made of any suitable sheet material such as celluloid, or perforated sheet metal as in the construction shown in Fig. 7. When the screen member extends in the position shown in Fig. 1, it intercepts rays of light from headlights of approaching automobiles and also rays from the sun if the sun is directly ahead. The screen member is prevented from rattling since the tension of the spring 48 firmly holds the plate 54 in the notches 36 and 40. When it is not desired to use the screen, the handle 44 is pushed forwardly to disengage the plate 54 from the notches and the handle is then turned with the result that the screen member is swung up into the position shown in Fig. 2 where it is out of the way under the visor. In this latter position, the plate 54 is firmly held by engagement with the notches 34 and 38. While passing from the position of Fig. 1 into that of Fig. 2, it is evident that the screen member 56 will pass through varying angles laterally and may be stopped in any position which will best intercept rays from the sun when the position of the sun is to one side. If the position of the sun is to the other side, then by applying pressure to the spring 48, the position of the plate 54 and screen relatively to the stop pin 32 may be reversed so that the screen member will be interposed between the driver and the sun.

In the form of invention shown in Figs. 8 and 10, a bracket 60 is provided with holes 62 for the purpose of securing it to the forward portion of the visor 16 by bolts or screws 64. The bracket 60 at its two ends has depending ears 66 provided with holes through which a rod 68 passes. A screen member 70 is provided which may be of the same material as the screen member 56 previously referred to. To one end of the screen member 70 there is secured a frame member 72 which has ears 74 at its ends bent out at right angles and through which the rod 68 passes. The frame 12 above the windshield 14 is provided with an opening in which a tube 76 is held by means of a head 78 on its inner end and a nut 80 on its outer end. A spring rod 82 passes through the tube 76, the inner end of this rod being provided with a knob 84. The pivot pin 86 having a screwthreaded hole is carried by one of the ears 74. The forward end of the spring rod 82 is threaded for a considerable distance and is screwed into the opening in the pivot pin 86 to such distance that when the screen 70 hangs vertically as shown in Fig. 8, the shank of the knob 84 will be in contact with the head 78 of the tube 76. The tube 76 is fitted into the frame above the windshield in such position that its axis is in the same vertical plane with the axis of the hole in the pivot pin 86, but is in a line directed somewhat above the pin 86. When the rod 82 is deflected from straight line position into the position shown and is secured in the pin 82, it is placed under tension and exerts an upward pressure on the pin tending to rotate the frame member 72 toward the right in Fig. 8 and toward the left in Fig. 9. This pressure together with the friction of the rod 82 in the tube 76 is sufficient to hold the screen member down in position for service with the knob 84 bearing against the head of the tube 76 as in Fig. 8 or folded up against the underside of the visor as in Fig. 9. When the screen member is not needed, it is necessary merely to pull backwardly on the knob 84 to rotate the frame member 72 and the screen member 70 to the left about the bolt 68 until the screen comes into contact with the underside of the visor where the tension of the spring rod 82 will hold it firmly. By pushing forwardly on the knob until it strikes the tube 76, the frame member 72 and the screen member 70 will be rotated toward the right until they are in vertical position where the screen will be held stationary by the upward pressure of the rod 82.

We claim:

1. A glareshield device for automobiles comprising a support positioned in advance of and above the windshield, a screen swingingly mounted on said support, whereby it may be swung down into operative position ahead of the windshield and may be swung up into folded position, a slidable rotatable spring-tensioned rod extending into the automobile, and connections between the outer end of said rod and said screen whereby rotative movement of said rod causes said screen to move from one position to another and whereby sliding movement of said rod serves to firmly hold said screen in its two positions and to release it therefrom.

2. A glareshield device for automobiles comprising a support positioned in advance of and above the windshield, said support having a beveled surface, a screen carried by said support and having a beveled surface engaging said first beveled surface, and operating mechainsm for swinging said screen with the leveled surface in engagement with each other whereby said scren is caused to swing through varying angular positions laterally between an operative position ahead of the windshield and a folded position above the windshield.

3. A glareshield device for automobiles comprising a tubular support positioned in advance of and above the windshield, said support having a beveled surface, a screen carrying a beveled surface engaging said first beveled surface, a rod to the forward end of which said screen is pivotally attached, said rod being rotatably mounted in said tubular support, and means for rotating said rod whereby said screen is caused to swing through varying angular positions laterally between an operative position ahead of the windshield and a folded position above the windshield.

4. A glareshield device for automobiles comprising a tubular support positioned in advance of and above the windshield, the front of said support having a beveled surface, a screen carrying a beveled surface engaging said first beveled surface, a rod to the forward end of which said screen is pivotally attached, said rod being rotatably and slidably mounted in said tubular support, a spring normally holding said rod in rearward position to maintain said beveled surfaces in engagement with each other, and means for rotating said rod whereby said screen is caused to swing through varying angular positions laterally between an operative position ahead of the windshield and a folded position above the windshield.

5. A glareshield device for automobiles comprising a tubular support positioned in advance of and above the windshield, the front of said support having a ringlike beveled surface provided with notches, a screen, a plate secured to said screen, said plate having a beveled surface engaging said first beveled surface and adapted to fit into said notches, a rod to the forward end of which said plate is pivotally attached, said rod being rotatably and slidably mounted in said tubular support, means for rotating said rod whereby said screen is caused to swing through varying angular positions laterally between an operative position ahead of the windshield and a folded position above the windshield, and a spring normally holding said rod in rearward position to maintain said beveled surfaces with engagement with each other and to cause said plate to recede into said notches when said screen is in its extreme positions.

In testimony whereof we hereunto affix our signatures.

WILLIAM H. BURTIS.
MONROE S. HOWARD.